(12) United States Patent
Dale' et al.

(10) Patent No.: US 7,913,602 B2
(45) Date of Patent: Mar. 29, 2011

(54) METHOD AND APPARATUS FOR CUTTING A RIBBON OF RUBBER-COATED FABRIC

(75) Inventors: Pietro Dale', Cologno Monzese (IT); Stefano Bellini, Romano di Lombardia (IT)

(73) Assignee: Pirelli Pneumatici S.p.A., Milan (IT)

( * ) Notice: Subject to any disclaimer, the term of this patent is extended or adjusted under 35 U.S.C. 154(b) by 68 days.

(21) Appl. No.: 12/231,743

(22) Filed: Sep. 5, 2008

(65) Prior Publication Data

US 2009/0241747 A1 Oct. 1, 2009

Related U.S. Application Data (62) Division of application No. 10/493,385, filed as application No. PCT/IB01/02025 on Oct. 25, 2001, now Pat. No. 7,434,500.

(51) Int. Cl.
*B26D 3/14* (2006.01)
*B26D 1/10* (2006.01)

(52) U.S. Cl. .................. 83/862; 83/33; 83/213; 83/683; 83/917; 83/951; 29/50

(58) Field of Classification Search ............... 83/15, 16, 83/33, 39–41, 44, 45, 49, 52, 171, 862, 917, 83/922, 951, 213–217, 30, 405, 404.4, 682, 83/683, 627–629, 632, 633, 914; 29/550–650; 144/1.1, 2.1, 3.1, 35.1, 42

See application file for complete search history.

(56) References Cited

U.S. PATENT DOCUMENTS

| 2,665,757 | A | * | 1/1954 | Stevens et al. | 83/210 |
| 3,562,859 | A | * | 2/1971 | McIntyre | 425/310 |
| 3,641,855 | A | * | 2/1972 | Balle | 83/171 |
| 4,043,234 | A | * | 8/1977 | Godin et al. | 83/40 |
| 4,608,890 | A | * | 9/1986 | Still et al. | 83/49 |
| 4,922,774 | A | * | 5/1990 | Oldeman | 83/175 |
| 5,784,938 | A | * | 7/1998 | Watkins et al. | 83/528 |
| 6,257,113 | B1 | * | 7/2001 | Lederbauer | 83/620 |
| 6,510,773 | B1 | * | 1/2003 | Hart et al. | 83/171 |

* cited by examiner

*Primary Examiner* — Edward Landrum
(74) *Attorney, Agent, or Firm* — Finnegan, Henderson, Farabow, Garrett & Dunner, LLP (57) ABSTRACT

A method for cutting a ribbon of rubber-coated fabric includes dragging a free end of the ribbon past a working position of a punching device, forming a notch between two adjacent reinforcing cords of the ribbon using the punching device, moving a counter-blade of the punching device away from the working position, inserting at least one cutting blade through the notch, and performing first and second cuts of the ribbon. An associated apparatus includes a punching device and a cutting device. The punching device includes an incision tool, an abutting counter-blade, and control devices for moving the incision tool and the abutting counter-blade toward and away from the ribbon. The cutting device includes at least one cutting blade and a control device for moving the at least one cutting blade toward and away from the ribbon.

9 Claims, 5 Drawing Sheets

METHOD AND APPARATUS FOR CUTTING A RIBBON OF RUBBER-COATED FABRIC

CROSS-REFERENCE TO RELATED APPLICATIONS

This is a division of pending application Ser. No. 10/493,385, filed Nov. 23, 2004 now U.S. Pat. No. 7,434,500, which is a national-phase entry under 35 U.S.C. §371 from International Application No. PCT/IB01/02025, filed Oct. 25, 2001, in the International Bureau of the World Intellectual Property Organization, the content of which is relied upon and incorporated herein by reference.

BACKGROUND OF THE INVENTION

In a first aspect thereof, the present invention relates to a method for cutting a ribbon of rubber-coated fabric including a plurality of reinforcing cords substantially parallel to one another, such as for instance a belt strip or other semi-finished reinforcing products intended for manufacturing the carcass of a green tire for vehicles.

In the following description and in the subsequent claims, the term: "ribbon of rubber-coated fabric," is used to indicate any continuous strip of rubber mixture embedding a plurality of reinforcing cords, by way of example metal and/or textile cords substantially parallel to one another.

The present invention also relates to an apparatus for cutting a ribbon of rubber-coated fabric including a plurality of reinforcing cords as defined above.

DESCRIPTION OF THE RELATED ART

As is known, a green tire is essentially constituted by a composite structure obtained by assembling together a plurality of semi-finished products and comprising: an airproof liner; at least one reinforcing ply; two bead cores to which the ply edges are associated; an elastomeric filling fixed to the radially outer surface of each bead core; a belt structure arranged as a crown around the torically shaped carcass ply generally comprising at least one pair of radially superposed belt strips provided with reinforcing cords crossed with each other and inclined with respect to the circumferential direction of the tire; a tread band wrapped around the belt structure; and a pair of axially opposite sidewalls radially extending between the bead cores and the tread band. The belt structure may also comprise a further layer generally arranged at the radially outermost position, incorporating a plurality of circumferentially oriented reinforcing cords, otherwise known as zero degree cords.

In order to manufacture semi-finished reinforcing products, such as for example the belt strips intended for forming the above-mentioned belt structure, a ribbon of rubber-coated fabric is generally utilized, said ribbon including a plurality of reinforcing cords substantially parallel to one another and inclined of a predetermined angle with respect to a central longitudinal plane of the ribbon (said angle being typically comprised between about 15° and 30°), which ribbon is cut to size according to a cutting direction as parallel as possible to the direction of the reinforcing cords in order to minimize the risk of cutting or damaging one or more cords. The damaged reinforcing cords, in fact, and particularly those emerging from the ribbon in which they are incorporated (know in the art with the term of "wild wires"), cause not only the generation of a semi-finished product of unacceptable quality, but may also cause the jamming of the automatic machines utilized for manufacturing the green tires, with a consequent need of labor intervention and an increase in production costs. Besides, if an imprecise cutting of the ribbon of rubber-coated fabric should cause a complete breaking of the reinforcing cords (such-as for example the breaking of one or more threadlike elements of the cord and/or one or more strands of the cord) or a divarication of the free end of a cord (known in the art with the term of "splayed point cord"), the further risk of a defect difficult to be detected by means of a conventional quality control of the tire arises, so that the defect can become visible only in operation, leading even to a precocious and dangerous damages of the tire structure.

In view of above, one of the objects of the art of the field is that of preventing an imperfect cutting of the ribbon of rubber-coated fabric from negatively affecting both the tire quality and the productivity of the plants for manufacturing green tires.

To this purpose, for example, cutting apparatuses provided essentially with a blade intended, in a first step, for penetrating the rubber between two adjacent cords, approximately in the middle of the ribbon of rubber-coated fabric, are used, forming in this manner a through-notch of predetermined length and, in a second step, for cutting the ribbon of rubber-coated fabric from one side to the other, starting from the above-mentioned notch. In some cases, said steps of penetration (i.e. of incision) within the rubber of the fabric and of cutting are carried out, respectively, by two blades instead of one.

For instance, U.S. Pat. Nos. 2,665,757 and 3,641,855 describe a cutting apparatus essentially constituted by a pair of identical blades movable along a direction parallel to the cords, each one of which provided with a sharpened portion adapted to penetrate the ribbon of fabric, and provided with a blunt portion to tear the rubber of the ribbon present between adjacent cords. On the basis of the cutting methods of the ribbon of rubber-coated fabric illustrated therein, the blades, by means of their sharpened portion, make a starting notch in the ribbon and, subsequently, by moving in opposite directions starting from the above-mentioned starting notch, complete said cutting while theoretically remaining between two adjacent cords.

The cutting methods and apparatuses described in the above documents, however, imply the non negligible risk of damaging or cutting the reinforcing cords, generating thereby the so-called "wild wires" during the starting incision step of the ribbon of rubber-coated fabric by the sharpened portions of the blades.

Besides, the cutting apparatus described in document U.S. Pat. No. 2,665,757 comprises two presser feet intended for holding in a fixed position the ribbon portion positioned astride the cutting zone, in order to facilitate the cutting operations.

However, in this manner, because of the rigid constraint to which said ribbon is subjected during the cutting operation, it has been found that the cords may be passed over and irreversibly damaged by the blade when the cords have—because of stretches or strains undergone by the ribbon during the preceding working and handling steps to which the ribbon is submitted—a different inclination with respect to the nominal inclination, on the basis of which the cutting direction is set.

A further similar cutting apparatus, showing the same drawbacks illustrated above, is described in U.S. Pat. No. 4,608,890. Said apparatus comprises only one blade performing a starting notch of the ribbon of rubber-coated fabric and completing the cut starting from said starting notch by means of a stroke extending between the opposite lateral edges of the ribbon.

Further cutting methods and apparatuses, described for instance in U.S. Pat. Nos. 4,156,378 and 4,210,042, employ a circular blunt blade or a pair of circular blunt blades able to engage, by a rotating motion, the ribbon of rubber-coated fabric and to cut the same between a pair of adjacent cords. Also in this case, it has been found that the cords may be easily passed over and irreversibly damaged by the circular blade rotating and translating when the cords have a different inclination with respect to the nominal inclination.

The above-mentioned drawbacks, not negligible even per se, are further amplified both when the cords have a reduced diameter (by way of example smaller than about 0.4-0.7 mm) and as the width of the ribbon of rubber-coated fabric to be submitted to the cutting operation increases (by way of example greater than about 350 mm) because of the following reasons.

Firstly, a trend to progressively reduce the diameter of the reinforcing cords has been spreading, which trend is mainly dictated by the attempt of reducing the moment of inertia of the tire and the overall weight of the same. Said trend increases the risk of cutting or damaging the cords, if markedly pointed or sharpened portions of the blades are utilized, as stressed above with reference to U.S. Pat. Nos. 2,665,757, 3,641,855 and 4,608,890. At the same time, said trend necessarily implies the requirement of increasing the density of the reinforcing cords in order to ensure the same mechanical strength which would be obtained by using cords having greater diameters and, with this requirement, the increased risk of damaging or even cutting a cord during the starting incision step of the ribbon of rubber-coated fabric. Secondly, the trend of employing tires having a footprint area always increasing, necessarily results in an increase of the width of the semi-finished products of rubber-coated fabric such as, for example, the belt strips. Said increase of the width necessarily causes the increase of the cutting path and, therefore, the likelihood of impairing the quality of the semi-finished product due to a cut made in an incorrect manner.

In addition to this trend and associated thereto, in order to increase the performance of the tire, the necessity of reducing the inclination angle of the reinforcing cords with respect to the central longitudinal axis has arisen. Hence, the necessity of performing a precise cut in terms of holding a cutting direction as constant as possible throughout the whole cutting path of the ribbon of rubber-coated fabric.

On the other hand, even if it were possible to ensure a substantially constant cutting direction throughout the whole cutting path of the ribbon of rubber-coated fabric, the risk of passing over and damaging one or more cords persists because of the risk of stretches or strains of the fabric in the preceding working steps, which risk is particularly high during the storage on a reel of the ribbon of rubber-coated fabric or in any case during the other handling operations of the same. Said stretches or strains of the ribbon of rubber-coated fabric, which are responsible for the deviation of the inclination of the reinforcing cords with respect to the nominal inclination, contribute to the difficulty of cutting a ribbon of rubber-coated fabric in a precise and repeatable manner without damaging the reinforcing cords thereof.

SUMMARY OF THE INVENTION

The Applicant has found that it is possible to overcome the drawbacks of the known art by performing the cutting operations by means of a cutting apparatus comprising: a punching device comprising an incision tool suitable for incising the ribbon within the space comprised between two adjacent cords along a cutting direction substantially parallel to the cords, and an abutting counter-blade cooperating with the incision tool; and a cutting device comprising at least a cutting blade movable along said cutting direction.

According to a first aspect thereof, the present invention relates therefore to a method for cutting a ribbon of rubber-coated fabric including a plurality of reinforcing cords substantially parallel to one another, said method comprising the steps of:

a) dragging a free end of said ribbon for a portion of predetermined length past a working position of a punching device;

b) forming between two adjacent cords by means of said punching device a notch of predetermined length extending along a cutting direction substantially parallel to said cords;

c) moving the counter-blade of the punching device away from said working position;

d) inserting at least one cutting blade through said notch, said at least one blade passing over the lying plane of said ribbon;

e) performing a first cut of said ribbon by shifting said blade along said cutting direction for a first portion extending between said notch and a first lateral edge of said ribbon; and f) performing a second cut of said ribbon "by shifting said blade along said cutting direction for a second portion extending between said notch and an opposite lateral edge of said ribbon.

Thanks to the fact that the punching device has an incision tool cooperating with the abutting counter-blade, said incision tool maintains its own insertion position between adjacent cords, so that it becomes advantageously possible to perform a notch between two adjacent reinforcing cords which affects only the rubber portion lying between the cords, minimizing the risk of intersecting said cords, and minimizing therefore both the amount of production scraps and the risk of jamming the automatic manufacturing machines.

Preferably, step b) of forming the notch is carried out by holding the ribbon upstream and downstream of the cutting direction at a distance such as to allow freedom of shifting, in a direction parallel to the lying plane of the ribbon, to the ribbon portion located at the above-mentioned working position of the incision tool of the punching device, i.e., at a position astride the cutting direction.

Advantageously, said freedom of shifting of said ribbon portion allows, during the incision operation, a corresponding shifting of said portion with respect to the incision tool against the lateral surface of which the reinforcing cords can possibly abut without however being cut or passed over by the incision tool if the inclination of said cords should deviate from the nominal inclination.

Preferably, also the first and the second cutting steps e), f) are carried out by holding the ribbon upstream and downstream of the cutting direction at a distance such as to allow a freedom of shifting, in a direction parallel to the lying plane of the ribbon, of said ribbon portion located astride the cutting direction.

Similarly to above, the reinforcing cords incorporated in the ribbon of rubber-coated fabric and adjacent to the cutting blade can advantageously freely shift with respect to the blade along the lying plane of the ribbon, reducing substantially to zero the risk of damaging the cords during the cutting steps.

In fact, in case of deviations of the inclination of the reinforcing cords with respect to the nominal inclination and thanks to the fact that the cutting blade is inserted into the notch so as to pass over the lying plane of the ribbon, the cords adjacent to the cutting blade abut against the lateral walls of the latter, eliminating the risk of being damaged by the blade cutting edges.

Hence, in this preferred embodiment, the reinforcing cords are not damaged neither during step b) of forming the notch, nor during steps e) and f) of cutting the ribbon, since said cords can follow the movements of the incision tool and, respectively, of the cutting blade, freely floating on the lying plane of the ribbon, so that the incision tool and the cutting blade engage only the rubber portions interposed between two adjacent cords.

Preferably, the notch obtained by the punching device in the above-mentioned step b) has a depth comprised between 80% and 90% of the overall thickness of the ribbon of rubber-coated fabric, such as to facilitate the insertion of the cutting blade into said notch, as provided by step d) of the method of the invention. Even more preferably, the notch formed by the punching device in the above-mentioned step b) is a through-notch, so as to further facilitate the insertion of the cutting blade into the notch.

Preferably, said step b) of forming the notch is carried out by a rotation-translational movement of the incision tool. Said preferred characteristic of the method, together with the fact that the ribbon of rubber-coated fabric can freely shift along its own lying plane, advantageously allows to prevent the undesired passing over of the reinforcing cords by the incision tool when the inclination of the cords is different from their nominal inclination, in a direction parallel to which the shifting direction (and therefore the incision direction) of the incision tool is set.

Preferably, the punching device is translated along the cutting direction for a stroke comprised between about 60 and about 100 mm and, even more preferably, between about 70 and about 90 mm.

Preferably, said steps c) and d) are carried out simultaneously, advantageously reducing thereby the working time.

According to a preferred embodiment, also the above-mentioned steps e) and f) may be carried out simultaneously by using a pair of cutting blades movable along the cutting direction but in an opposite direction with respect to each other, with a further advantageous reduction in working time.

Preferably, said cutting steps e) and f) are carried out by imparting to the cutting blade a translational speed comprised between about 1 m/min and about 15 m/min, more preferably between about 5 m/min and about 10 m/min.

According to a preferred embodiment thereof, the method of the invention further comprises the step of moving the incision tool of the punching device away from said working position before the step d) of inserting said at least one cutting blade through the notch formed in the ribbon.

In this manner, the insertion of said at least one cutting blade through the notch is advantageously further facilitated.

Preferably, the notch is formed astride the central longitudinal plane of the ribbon. In this manner, as first portion of the ribbon of rubber-coated fabric to be cut is selected that one involving the minimum risk of damaging the cords since said portion, being far from the lateral edges of said ribbon, is less sensitive to possible strains which might cause a deviation of the inclination of the reinforcing cords with respect to the nominal inclination.

According to a further preferred embodiment of the invention, the first cutting step e) is carried out by holding the cutting blade within the opposite lateral edges of the ribbon of rubber-coated fabric, i.e. preventing the cutting blade from coming out entirely from the lateral edges of the rubber-coated fabric. In this manner, at the end of the first cutting step e) and before carrying out the second cutting step f), the cutting blade needs not to be positioned again in the space between the cords where the first cut has been made, since said blade has not been entirely removed from said fabric, remaining at least partly in touch with the latter.

Preferably, the method of the invention further comprises the step of heating to a given temperature said at least one cutting blade. In this manner, the cutting of the ribbon of rubber-coated fabric between two adjacent reinforcing cords is advantageously facilitated.

Preferably, said temperature is comprised between about 100° C. and about 140° C. and, even more preferably, between about 110° C. and about 130° C.

According to a second aspect thereof, the present invention relates to an apparatus for cutting a ribbon of rubber-coated fabric including a plurality of reinforcing cords substantially parallel to one another, said cutting apparatus comprising:
a) a punching device comprising:
  a1) an incision tool suitable for incising said ribbon between two adjacent cords along a cutting direction substantially parallel to said cords;
  a2) an abutting counter-blade, said incision tool cooperating with said abutting counter-blade at a working position of the punching device; and
  a3) respective control devices for moving the incision tool and the abutting counter-blade towards and away from said ribbon; and
b) a cutting device comprising:
  b1) at least one cutting blade movable along said cutting direction for cutting said ribbon along said direction and in a direction substantially parallel to said cords; and
  b2) a control device for moving said at least one cutting blade towards and away from said ribbon.

Advantageously, the presence of the punching device and of the abutting counter-blade cooperating with the same allows the apparatus of the invention to perform an incision of the ribbon of rubber-coated fabric such as to minimize the risk of intersecting the reinforcing cords.

Preferably, the cutting apparatus of the invention further comprises a rotation device intended for aligning along the desired cutting direction—in a preliminary step of the method of the invention—the incision tool and, respectively, the abutting counter-blade cooperating with the same and the cutting blade.

According to a preferred embodiment of the apparatus of the invention, said incision tool comprises a punching disc provided with a rounded peripheral edge. Preferably, said punching disc is pivotally supported by the punching device.

Preferably, the punching disc has a diameter comprised between about 30 mm and about 60 mm and, even more preferably, between about 40 mm and about 50 mm.

In a preferred embodiment thereof, the punching device further comprises a handling device for shifting said incision tool along the cutting direction.

Thanks to the fact that the punching disc performs a movement of rotation-translational type, the risk of damaging the cords is advantageously minimized, enabling the latter to abut against the opposite lateral faces of the disc and carrying out a correct punching just of the rubber portion interposed between two adjacent cords of the ribbon of rubber-coated fabric.

Preferably, said at least one cutting blade comprises a blade body laterally provided with at least one recess provided with a respective cutting edge.

Preferably, said blade body is laterally provided, on axially opposite parts, with a pair of recesses provided with a respective cutting edge. The presence of two opposite cutting edges in the blade body advantageously allows to have only one blade able to cut the ribbon of rubber-coated fabric in both directions along the cutting direction, i.e. from the notch towards the first lateral edge of said ribbon and from the notch towards the second lateral edge of said ribbon, maintaining always the same orientation of the blade body. Said preferred embodiment is particularly suitable when the apparatus comprises only one cutting blade.

According to a preferred embodiment, the cutting device further comprises a handling device for shifting said cutting blade along the cutting direction.

Preferably, the punching device and the cutting device are fixed to a same supporting trolley movable along the cutting direction, said trolley constituting an unique handling device along the cutting direction both of the punching device and of the cutting device.

Preferably, the cutting device of the invention further comprises a dragging device for dragging a free end of the ribbon for a portion of predetermined length past the working position of the punching device. Preferably, said portion corresponds to the length of the strip (or portion) of the reinforcing rubber-coated fabric to be used in the manufacture of the green tire.

In this manner, it is advantageously possible to cut to size the ribbon of rubber-coated fabric into a plurality of portions of predetermined length.

According to a further preferred embodiment, said dragging device of the ribbon comprises a plate movable between a first position upstream of the working position of the punching device and a second position located downstream of the working position of the punching device of said portion of predetermined length.

Preferably, the cutting apparatus further comprises a device for supporting said ribbon, while maintaining the same at a predetermined distance from the cutting line of the cutting blade, so that the ribbon edges adjacent to the cutting blade can be freely shifted.

Lastly, in a preferred embodiment, the cutting apparatus further comprises a heating device for heating said at least one cutting blade to a given temperature, so as to further facilitate the cutting operations of the ribbon of rubber-coated fabric.

BRIEF DESCRIPTION OF THE DRAWINGS

Additional features and advantages of the invention will be more readily apparent from the description of some embodiments of a method for cutting a ribbon of rubber-coated fabric according to the invention, made with reference to the attached drawings in which, for illustrative and non limiting purposes, a preferred embodiment of a cutting apparatus for carrying out said method is shown.

In the drawings.

DETAILED DESCRIPTION OF THE EXEMPLARY EMBODIMENTS

Figure 1:
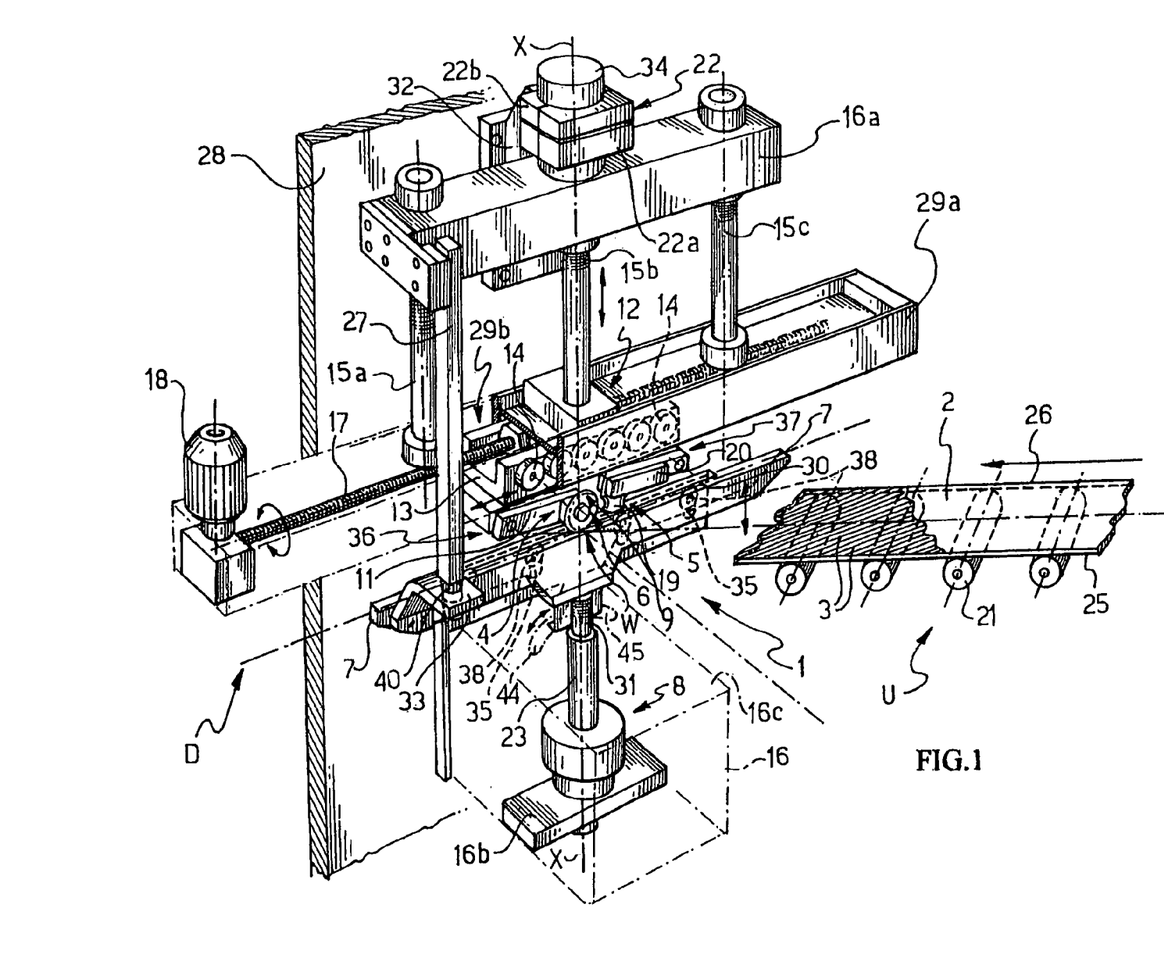
FIG. 1 is a perspective view of a preferred embodiment of a cutting apparatus according to the invention.
Figure 2:
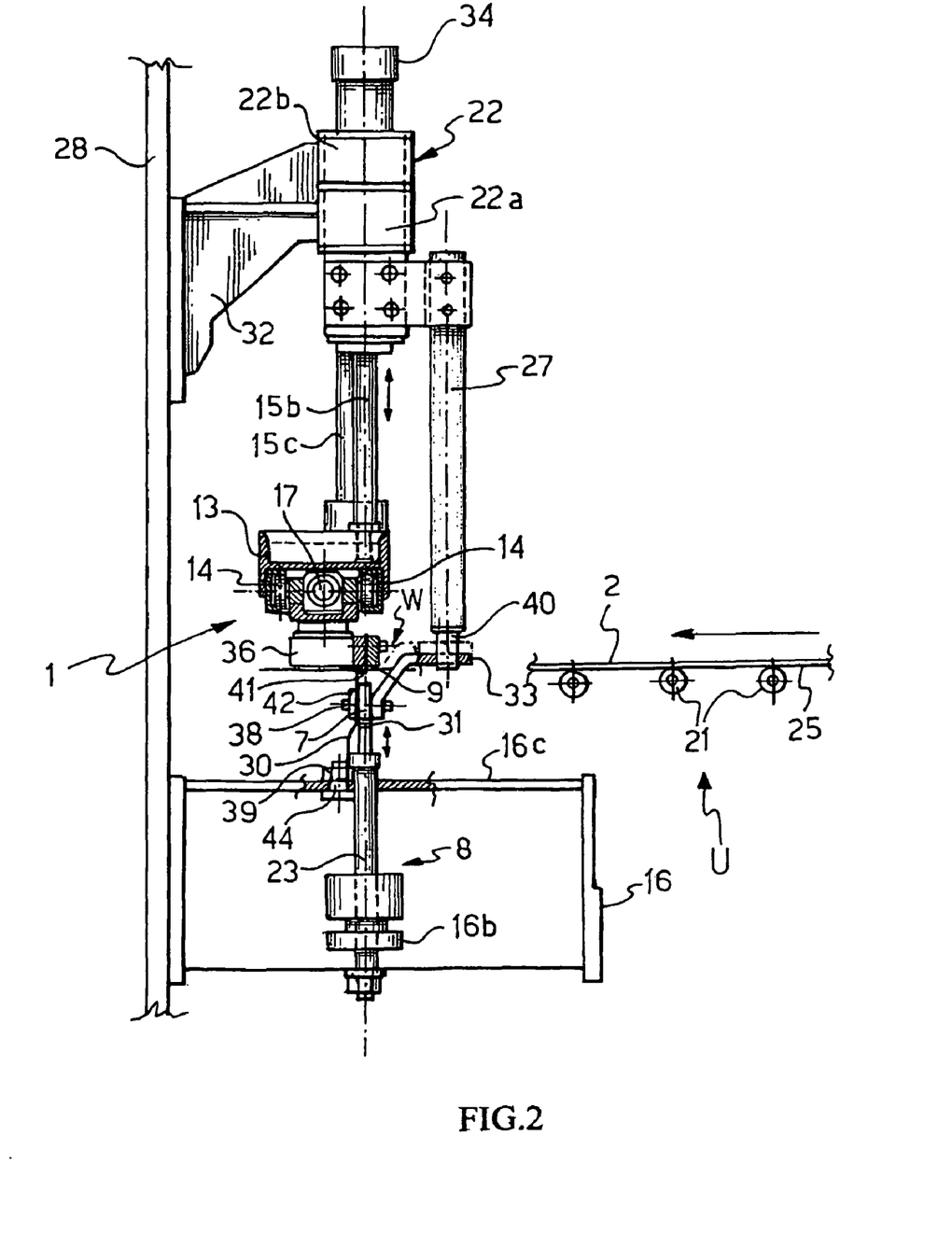
FIG. 2 is a lateral elevational view of the cutting apparatus of FIG. 1.

With reference to FIGS. 1 and 2, a cutting apparatus according to the present invention for cutting a ribbon 2 of rubber-coated fabric including a plurality of reinforcing cords 3, for example of metal, substantially parallel to one another, is generally indicated with reference sign 1. For illustrative purpose, the cords 3 (as shown better in FIG. 4) are inclined of a predetermined angle a with respect to a central longitudinal plane II-II of the ribbon 2. Said angle a is for example comprised between about 5° and about 175°, said range including the inclination of the reinforcing cords generally provided in a pair of belt strips radially superposed to each other, the cords of each strip being crossed with respect to those of the radially adjacent strip and inclined with respect to the circumferential direction of the tire.

In FIG. 1, the ribbon 2 of rubber-coated fabric to be cut into a plurality of portions of predetermined length, for example intended for constituting a plurality of belt strips, is at a position U upstream of the apparatus I. At said position U, the ribbon 2 is supported by a plurality of rolls 21 or other suitable devices known in the art, such as conveyor belts, mobile tables, etc., suitable for conveying the ribbon 2 of rubber-coated fabric from a production or storing device of the ribbon, for example a collection reel (not shown), towards the cutting apparatus 1.

According to the invention, the cutting apparatus I comprises a punching device 4 and a cutting device 5.

More particularly, the punching device 4 comprises an incision tool 6 suitable for incising the ribbon 2 between two adjacent cords 3 along a cutting direction C-C substantially parallel to the cords 3 (see FIG. 4), an abutting counter-blade 7, a control device 36 for moving the incision tool 6 towards and away from said ribbon 2 of rubber-coated fabric, as well as a control device 8 for moving the abutting counter-blade 7 towards and away from said ribbon 2 of rubber-coated fabric.

According to the preferred embodiment shown, the incision tool 6 comprises a punching disc 9 provided with a rounded peripheral edge 10, which disc is pivotally mounted at a free end of an arm 11 of the control device 36 of the punching disc 9.

The arm 11, in its turn, is hinged, at the other free end thereof, to a trolley 13, better illustrated below.

The incision tool 6 cooperates with the abutting counter-blade 7 at a working position W of the punching device 4. The vertical translation of the counter-blade 7, preferably made of stellite or any other material of suitable hardness, is controlled by the already mentioned control device 8.

According to the invention, the cutting device 5 comprises at least one cutting blade 19 movable along the cutting direction C-C for cutting the ribbon 2 along this direction and in a direction substantially parallel to the cords 3, and a control device 37 for moving the cutting blade towards and away from the ribbon 2 of rubber-coated fabric.

The blade 19 of the cutting device 5 comprises at least one recess provided with a respective cutting edge. According to the preferred embodiment shown in FIG. 1, the blade body is laterally provided with a pair of recesses, each provided with a respective cutting edge.

Preferably, the control device 37 comprises a control arm 20 on which the cutting blade 19 is supported at a free end thereof. In its turn, the arm 20 is hinged, at the other free end thereof, to the trolley 13. For illustrative purpose, the control devices 36 and 37 for moving the incision tool 6 and, respectively, the cutting blade 19 towards and away from the ribbon 2 may comprise respective actuators, for example of pneumatic type, not shown and of a conventional type, acting on the incision tool 6 and, respectively, on the cutting blade 19 by means of the respective control arms 11 and 20.

The control device 8, intended for moving the abutting counter-blade 7 towards and away from the ribbon 2 of rubber-coated fabric, comprises, in the preferred embodiment shown, a pneumatic cylinder 23 suitable for shifting, by means of a stem 31, the counter-blade 7 in touch with and, alternatively, away of a predetermined distance from the ribbon 2, in order to make the counter-blade 7 cooperate with the incision tool 6. Besides, said control device 8 is suitable for removing the counter-blade 7 from the range of action of the cutting blade 10, at a position of non-interference with the stroke of the latter.

In the embodiment shown, the pneumatic cylinder 23 acting on the counter-blade 7 is mounted on a base 16b fixed, in its turn, to a supporting frame 16.

According to the embodiment shown, the punching device 4 and the cutting device 5 further comprise respective handling devices for shifting the punching disc 9 and, respectively, the cutting blade 19 along the cutting direction C-C. In the preferred shown embodiment, the punching disc 9 and the cutting blade 19 are translated along the cutting direction C-C by a same handling device 12 comprising said supporting trolley 13 movable along the cutting direction C-C. Preferably, the trolley 13 is horizontally translated by means of a plurality of wheels 14, preferably arranged in two rows parallel to each other to increase the stability of the trolley 13, said wheels 14 sliding along a pair of tracks 29a, 29b suitably supported, for instance by means of a central rod 15b and two lateral rods 15a, 15c, by means of a tie-rod pivotally mounted above the trolley 13 about a rotation axis X-X of the cutting apparatus 1.

According to the preferred embodiment shown, the trolley 13 is horizontally translated by a lead screw 17 kinematically connected to an electric motor 18. In this way, a rotation of the lead screw 17 turns into a corresponding horizontal translation of the trolley 13 along the cutting direction C-C.

The central rod 15b, preferably coaxially extended with respect to said rotation axis XX, is vertically translated by a suitable control device, such as for example a pneumatic cylinder 34, towards and away from the lying plane of the ribbon 2, so that the distance of the trolley 13 with respect to the lying plane of the ribbon 2 can be conveniently adjusted on the basis of the size of the incision tool 6 and of the cutting blade 19.

In other words, the trolley 13 can be both translated towards or away from the lying plane of the ribbon 2 by the pneumatic cylinder 34 and rotated about the rotation axis X-X in a given angular position.

The cutting apparatus I may further comprise a dragging device (conventional per se and not shown) for dragging a free end of the ribbon 2 for a portion of predetermined length past the working position W of the punching device 4. Said dragging device may for instance include a dragging plate, preferably provided with magnets, parallel to the counter-blade 7 and movable between the position U upstream of the working position W of the punching device 4 and a position 0 downstream of the working position W of the punching device 4. More particularly, said dragging plate is suitable for dragging the ribbon 2 of rubber-coated fabric away from the rolls 21 towards the punching device 4 for a portion having a length equal to the length of the strip of fabric to be obtained.

In alternative to the magnets, the dragging plate may be provided with devices suitable for holding the ribbon material, such as for example a plurality of suction cups connected to a vacuum pump, particularly suitable when the cords 3 are made of a non-magnetic material, for example textile fibers, glass fibers or mixed fibers.

Alternatively, the dragging device may include a pair of conveyor belts located at the positions U upstream and, respectively, 0 downstream of the apparatus 1, and intended for being alternatively active on the ribbon 2.

According to the embodiment shown, the cutting apparatus 1 further comprises a device for supporting the ribbon 2 at a predetermined distance from the cutting path performed by the cutting blade 19 when the counter-blade 7 is moved away from the working position W.

In the example illustrated, the device for supporting the ribbon 2 comprises a sheet 30 substantially L-shaped at the upper end thereof, so as to form a lip 41 antilevered from a central body of the sheet 30, substantially throughout the length of the same. Conveniently, the lip 41 provides a bearing surface for the ribbon 2 when the counter-blade 7 is moved away from the working position W.

For this purpose, the sheet 30 is laterally supported with respect to the counter-blade 7 by the frame 16, against which the sheet 30 is held at the opposite end with respect to lip 41 by means of a plurality of bolts 39 positionable at will between respective slot positions 44, 45 suitably shaped and obtained on an upper face 16c of the frame 16.

Advantageously and as will be more apparent in the following, when placed between slot positions 44 and 45 the bolts can hold the sheet 30 in the desired angular position, after a rotation of said sheet about the rotation axis X-X of the cutting apparatus 1.

In order to accomplish a vertical slide of the counter-blade 7, the sheet 30 comprises a plurality of slots 35 of predetermined length, in which a corresponding plurality of stakes 38 protruding from the counter-blade 7 is slidingly mounted. Besides, the reciprocal distance between the sheet 30 and the counter-blade 7 can be advantageously adjusted by means of a plurality of nuts 42 engagingly screwed on a threaded end of the stakes 38.

In this way, the counter-blade 7 can also vertically translate towards and away from the ribbon 2 of rubber-coated fabric for a stroke of predetermined length, substantially equal to the length of the slots 35.

According to the preferred embodiment shown, the counter-blade 7 and the sheet 30 associated thereto integrally rotate with the tie-rod 16a through a rod 27 fastened, on the upper end thereof, to the tie-rod 16a and cooperating with an arm 33 fastened to the counter-blade 7.

A rotation of the tie-rod 16a about the axis X-X turns therefore into a corresponding rotation of the trolley 13 and, thanks to the presence of the rod 27 and of the arm 33 connected thereto, of the counter-blade 7 and of the sheet 30.

Conveniently, a shank 40 of predetermined length extends from the lower end of the rod 27 and is received, thanks to the mating shapes of the same, in a corresponding hole obtained at the free end of the arm 33.

In this way, the arm 33 can slide with respect to the rod 27 each time the counter-blade 7 is vertically driven by the pneumatic cylinder 23.

According to the embodiment shown, the cutting apparatus 1 further comprises a blocking device, schematically indicated at 22 in FIG. 1, including for instance two jaws 22a, 22b, one of which is fastened to the wall 28 by means of a fastening arm 32, which jaws are suitable for being tightened around the central rod 15b. The blocking device 22, closed for instance by means of suitable tightening screws, not shown, will hold the trolley 13, the counter-blade 7 and the sheet 30 in the desired angular position with respect to the ribbon 2, so that the incision tool 6, the abutting counter-blade 7 cooperating with the same, the cutting blade 19 and sheet 30 are all aligned along the 5 above-mentioned cutting direction C-C.

Thanks to the presence of said blocking device 22, it is advantageously possible to feed the ribbon 2 of rubber-coated fabric to the apparatus 1 through the rolls 21 without changing the feed direction imparted to the ribbon 2 by the rolls 21 in case of variation of the inclination of the reinforcing cords 3, but simply rotating the cutting apparatus 1 so as to align the cutting direction C-C with the new inclination of the cords 3.

The cutting apparatus 1 may further include a heating device, conventional per se and not shown, for heating the cutting blade 19 to a given temperature.

With reference to the above-mentioned apparatus, the method according to the invention for cutting a ribbon 2 of rubber-coated fabric, for example for cutting said ribbon into a plurality of strips of predetermined length, includes in a preferred embodiment thereof the following steps.

The ribbon 2, coming for example from a collection reel, is positioned on the rolls 21 in order to be fed to the cutting apparatus 1. Should it be necessary, for example upon a change of the product specifications, the tie-rod 16a and, together with the same, the 20 trolley 13, the counter-blade 7 and the sheet 30, are rotated about the axis X-X in the desired angular position and held therein by means of the blocking device 22.

Conveniently, the bolts 39 holding the sheet 30 slide during said rotation between slot positions 44 and 45 having the purpose of enabling the desired rotation with respect to the upper face 16c of the frame 16.

At the end of said possible rotation, the sheet 30 is held at the new angular position with respect to the upper face 16c of the frame 16 through the bolts 39.

In this way, the incision tool 6, the cutting blade 19, the counter-blade 7 and the sheet 30 are aligned according to the predetermined cutting direction C-C, parallel to the direction of the reinforcing cords 3 of the ribbon 2.

In a first step of the method, a free end of the ribbon 2 is dragged by the dragging device—not shown—for a portion of predetermined length (indicated at I in FIG. 3) past the working position W of the punching device 4. Besides, in this step of the method, the counter-blade 7 is vertically translated, in the case in point lifted, by the stem 31 of the pneumatic cylinder 23 in contact with the ribbon 2 of rubber-coated fabric, to the working position W.

Figures 3, 4, 5, 6:
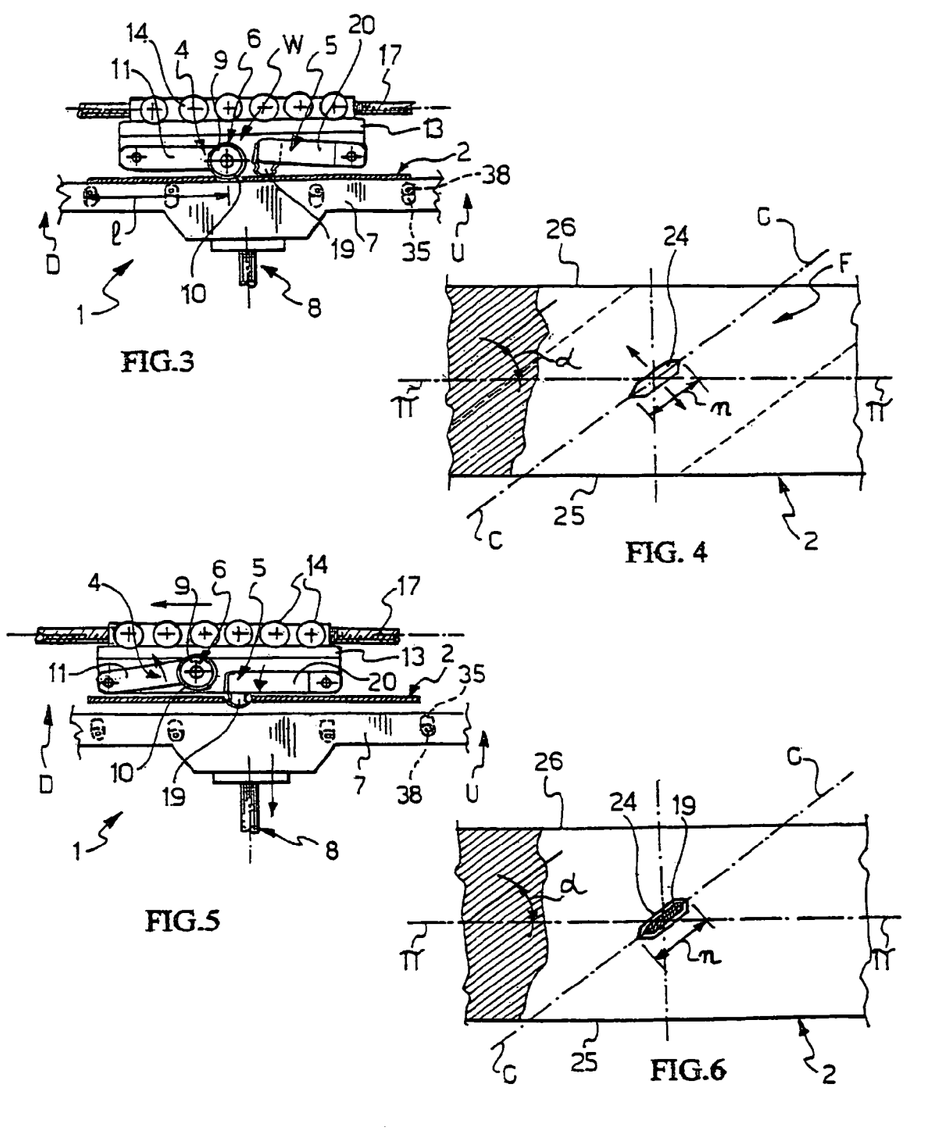
FIGS. 3, 5, 7 and 9 are schematic elevational views of some details of the cutting apparatus of FIG. 1, in different operative conditions of the same.
FIGS. 4, 6, 8, 10, and 11 are partial schematic top views of a ribbon of rubber-coated fabric in different operative conditions of the apparatus of FIG. 1.

In a second step of the method of the invention, as shown in FIG. 4, a notch 24 having a predetermined length n extending along the cutting direction C-C is formed between two adjacent cords 3 of the ribbon 2.

This takes place by means of a rotation-translation of the punching disc 9 driven towards the ribbon 2 by the control device 36 and translated by the trolley 13 activated by the motor 18.

According to the embodiment shown, the ribbon 2 of rubber-coated fabric is supported upstream and downstream of the cutting direction C-C by the counter-blade 7 cooperating with the punching disc 9 for obtaining said notch 24. According to said embodiment, although the ribbon 2 of rubber-coated fabric is supported by said counter-blade 7, the portion of ribbon astride the cutting direction C-C at the working position W (said portion being indicated at F in FIG. 4) can still freely shift in a direction parallel to the lying plane of said ribbon. In other words, the cords 3 incorporated in the portion F of the ribbon 2 can move away from the punching device 4 in a direction substantially perpendicular to the cutting direction C-C.

In the preferred embodiment shown in FIG. 4, the notch 24 is a through-notch: however, according to further embodiments not shown, the step of forming the notch may concern a prevailing portion of the thickness of the ribbon 2 of rubber-coated fabric, leaving under the notch a thin layer of elastomeric material having a thickness such as not to interfere with the subsequent introduction of the cutting blade 19 through said notch.

According to the preferred embodiment shown in FIG. 4, the notch 24 is formed astride the central longitudinal plane TI-n of the ribbon 2. In this way, the central portion is advantageously selected as first portion of the ribbon 2 to be cut, said central portion being less subjected to strains which could cause an accidental deviation of the inclination of the reinforcing cords 3 with respect to the nominal inclination.

In a subsequent step of the method, the counter-blade 7 of the punching device 4 is moved away from the working position W—in the case in point, lowered—by the stem 31 of the pneumatic cylinder 23 to a position of non-interference with the cutting device 5.

According to the preferred embodiment shown, the ribbon 2 of rubber-coated fabric is supported downstream of the cutting direction C-C by the sheet 30, while being still free to shift the portion F of the ribbon 2 in a direction parallel to the lying plane of the ribbon 2, thus allowing the cords 31 to correspondingly shift in a direction substantially perpendicular to the cutting direction C-C, so as to prevent damages or accidental cuts of the cords 3.

After having lifted the punching disc 9 away from the ribbon 2 of rubber-coated fabric 10 by means of the control device 36 or simultaneously with such lifting step, in a further step of the method of the invention, as shown in FIGS. 5 and 6, the cutting blade 19 is inserted through the notch 24 by the control device 37, in such a way as to pass over the lying plane of the ribbon 2 supported by the sheet 30.

Figure 7:
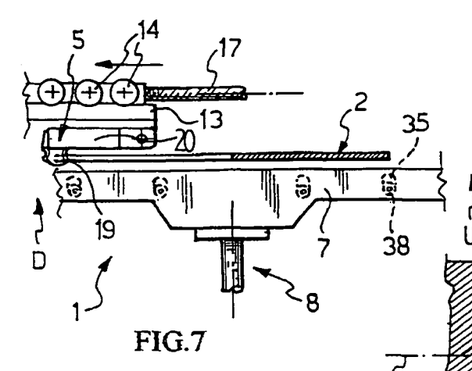
Figure 8:
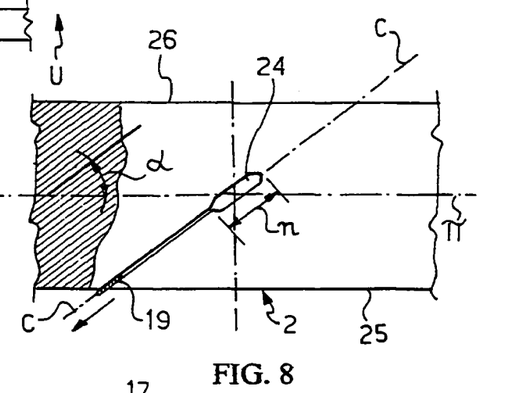
Figures 9, 10:
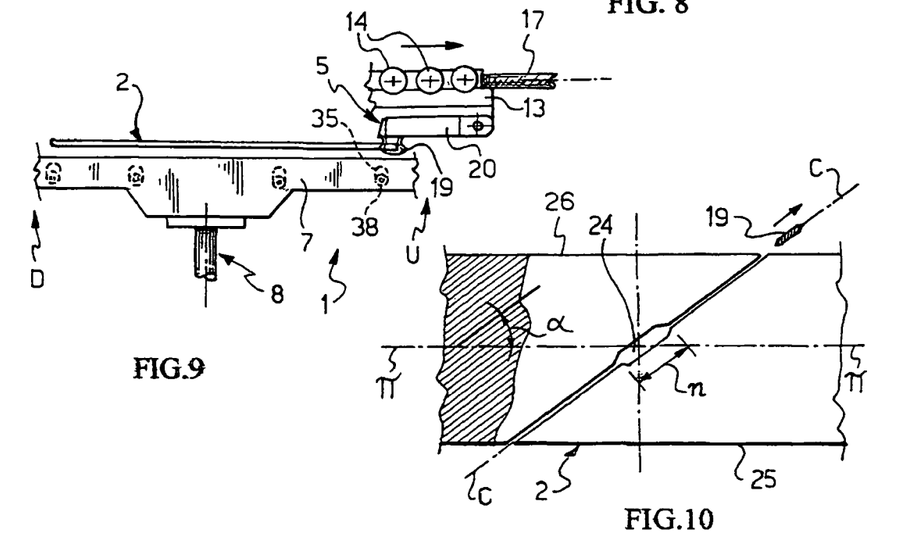

At this point, as shown in FIGS. 7 and 8, a first cut of the ribbon 2 is performed by shifting the blade 19 along the cutting direction C-C by means of the trolley 13 for a first portion extending between the notch 24 and a first lateral edge 25 of the ribbon 2 and, at the end of said step (as shown in FIGS. 9 and 10), a second cut of the ribbon 2 is performed by shifting the blade 19 by means of the trolley 13 along the cutting direction C-C for a second portion extending between the notch 24 and an opposite lateral edge 26 of the ribbon 2.

Preferably, the first cutting step is carried out limiting the stroke of the trolley 13, so as to hold the cutting blade 19 within the lateral edge 25 of the ribbon 2. In this way, the cutting blade is conveniently held within the cords 3 and the start of the second cutting step is facilitated, as this step does not require to position again the cutting blade 19 within the cords 3.

More in detail, according to said embodiment, once the first cut of the ribbon 2 has been performed, the blade 19 is moved by the trolley 13 towards the notch 24, making backwards the path followed during said first cut and remaining therefore within the groove obtained during said first cut. Subsequently, once the notch 24 has been reached, said cutting blade 19 is moved towards the opposite edge of said ribbon, so as to perform said second cut of said ribbon.

According to a further embodiment, once said first cut of the ribbon 2 has been performed, the blade 19 is lifted and makes backwards, towards the notch 24, the path followed during said first cut remaining in lifted position, Le. without interacting with said ribbon. Subsequently, once said notch 24 has been reached, the blade 19 is lowered and moved towards the opposite edge of the ribbon so as to perform the second cut of the same.

According to a preferred embodiment of the invention, the cutting blade 19 is heated to a given temperature, so as to facilitate the cutting operations of the portion of rubber of the ribbon 2 interposed between adjacent cords.

Figure 11:
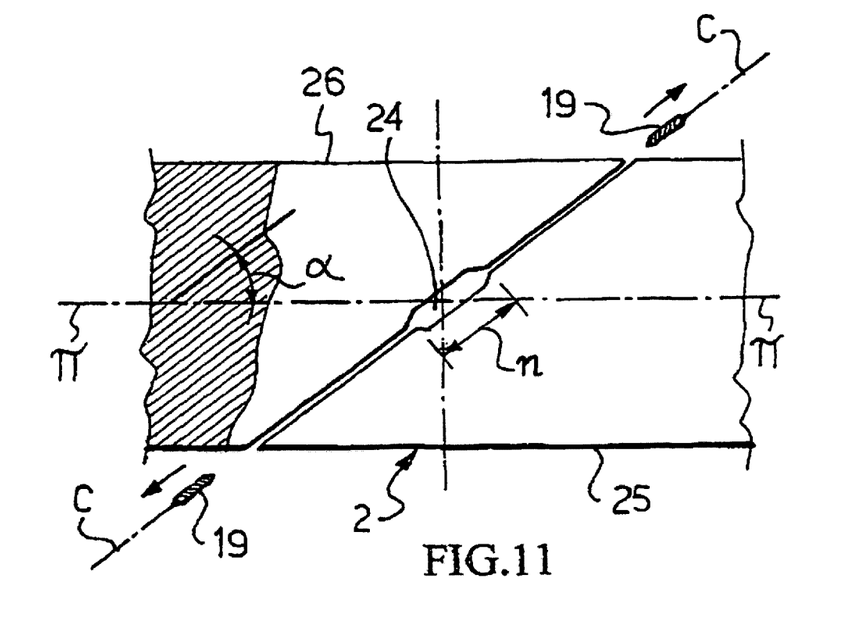

FIG. 11 is a partial schematic top view of a ribbon of rubber-coated fabric in an operative condition of another cutting apparatus according to the invention in which the apparatus of FIG. 1 has been modified to provide a pair of cutting blades A man skilled in the art may introduce in the above described invention modifications and variants in order to fulfill specific and contingent applicative requirements, modifications and variants anyhow falling within the protection scope as defined by the subsequent claims. As shown in FIG. 11, for example, it is possible to provide a pair of cutting blades 19, each of which is provided with its own cutting edge, said blades, once introduced into the notch 24, being separately moved on opposite parts of the cutting direction C-C, so as to execute at the same time the first cut and the second cut of the ribbon of rubber-coated fabric, with an advantageous increase in the production capacity of the method of the invention.

The invention claimed is:

1. An apparatus for cutting a ribbon of rubber-coated fabric, comprising:
    a punching device; and
    a cutting device;
    wherein the punching device comprises:
        an incision tool suitable for incising a notch in the ribbon between two adjacent reinforcing cords of the ribbon along a cutting direction substantially parallel to the reinforcing cords;
        an abutting counter-blade;
        wherein the incision tool and the abutting counter-blade are movable towards the ribbon, to a position of cooperation of said incision tool with said abutting counter-blade for obtaining said notch, and away from the ribbon, to a position of non-interference of the counter-blade with the cutting device; and
        respective control devices for moving the incision tool and the abutting counter-blade toward and away from the ribbon;
    wherein the cutting device comprises:
        at least one cutting blade movable along the cutting direction for cutting the ribbon along the cutting direction substantially parallel to the reinforcing cords when the counter-blade is in the position of non-interference with the cutting device; and
        a control device for moving the at least one cutting blade toward and away from the ribbon;
    wherein the ribbon includes a plurality of the reinforcing cords, and
    wherein the plurality of reinforcing cords are substantially parallel to one another.

2. The apparatus of claim 1, wherein the incision tool comprises a punching disc provided with a rounded peripheral edge.

3. The apparatus of claim 2, wherein the punching disc is pivotally supported by the punching device.

4. The apparatus of claim 1, wherein the punching device further comprises a handling device for shifting the incision tool along the cutting direction.

5. The apparatus of claim 1, wherein the at least one cutting blade comprises a blade body laterally provided with at least one recess provided with a respective cutting edge.

6. The apparatus of claim 1, wherein the at least one cutting blade comprises a blade body laterally provided with two recesses,
    wherein a first recess is on an opposite side from a second recess, and
    wherein both recesses are provided with a respective cutting edge.

7. The apparatus of claim 1, wherein the cutting device further comprises a handling device for shifting the at least one cutting blade along the cutting direction.

8. The apparatus of claim 1, wherein the punching device and the cutting device are fixed to a supporting trolley movable along the cutting direction.

9. The apparatus of claim 1, further comprising a device for supporting the ribbon while maintaining the ribbon at a predetermined distance from a cutting stroke of the at least one cutting blade.

* * * * *